US011119466B2

(12) United States Patent
Michopoulos et al.

(10) Patent No.: US 11,119,466 B2
(45) Date of Patent: Sep. 14, 2021

(54) IMPLICIT METHOD AND AN ALGORITHM FOR FLEXIBLE FUNCTIONALLY TAILORABLE SLICING FOR ADDITIVE MANUFACTURING

(71) Applicant: The Government of the United States of America, as represented by the Secretary of the Navy, Arlington, VA (US)

(72) Inventors: John Michopoulos, Washington, DC (US); Athanasios Iliopoulos, Chevy Chase, MD (US); John Steuben, Oxon Hill, MD (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 331 days.

(21) Appl. No.: 15/829,088

(22) Filed: Dec. 1, 2017

(65) Prior Publication Data
US 2018/0157243 A1     Jun. 7, 2018

Related U.S. Application Data

(60) Provisional application No. 62/429,110, filed on Dec. 2, 2016.

(51) Int. Cl.
*G05B 19/4099*     (2006.01)
*B33Y 50/02*     (2015.01)

(52) U.S. Cl.
CPC ......... *G05B 19/4099* (2013.01); *B33Y 50/02* (2014.12); *G05B 2219/35134* (2013.01); *G05B 2219/49007* (2013.01)

(58) Field of Classification Search
CPC ...... G05B 19/4099; G05B 2219/49007; G05B 2219/35134; B33Y 50/02
See application file for complete search history.

(56) References Cited

U.S. PATENT DOCUMENTS

| 2016/0096318 A1* | 4/2016 | Bickel | B29C 67/0051 |
| | | | 264/40.1 |
| 2018/0052433 A1* | 2/2018 | Vernon | G05B 19/4099 |
| 2018/0250748 A1* | 9/2018 | Page | B22F 3/1055 |

OTHER PUBLICATIONS

Adams, D and C. J. Turner, "An Implicit Slicing Method for Additive Manufacturing Processes", 2017, Journal: Virtual and Physical Prototyping, vol. 13, No. 1, pp. 2-7 (Year: 2017).*

* cited by examiner

*Primary Examiner* — Mohammad Ali
*Assistant Examiner* — Sheela Rao
(74) *Attorney, Agent, or Firm* — US Naval Research Laboratory; Richard Bis

(57) ABSTRACT

A method for flexible functionally tailorable slicing for additive manufacturing includes the steps of receiving and parsing an input model of an object to be additively manufactured; reconstructing a domain boundary of the object; computing individual layer boundaries of the object; constructing, for each layer, layer domains from respective enclosing boundaries; computing, for each layer, a perimeter shell and a volumetric infill by finding level sets of a field function selected by a user; collecting and arranging into a coherent sequence each perimeter shell and volumetric infill; and formatting the coherent sequence as motion commands for an additive manufacturing system.

20 Claims, 16 Drawing Sheets

IMPLICIT METHOD AND AN ALGORITHM FOR FLEXIBLE FUNCTIONALLY TAILORABLE SLICING FOR ADDITIVE MANUFACTURING

RELATED APPLICATIONS

This application claims the benefit of U.S. Provisional Application No. 62/429,110 filed Dec. 2, 2017, which is hereby incorporated herein by reference.

FIELD OF INVENTION

The present invention relates generally to additive manufacturing, and more particularly to toolpath generation for additive manufacturing.

BACKGROUND

Additive manufacturing, also known as layered manufacturing, rapid prototyping, or less formally as 3D printing, is an increasingly important family of fabrication techniques for the production of a wide variety of objects and components.

Slicers are a class of algorithms in the domain of computational geometry that are used to convert input 3D geometry into a series of motion commands (a "toolpath") for an additive manufacturing machine. The slicer is required to both process the input geometry into a suitable toolpath for additive manufacturing, and export this toolpath as a series of numeric control (NC) commands that are subsequently conveyed to the additive manufacturing hardware.

The development of modern slicers was preconditioned by prior developments in the field of Computer Numeric Control (CNC) machining. NC toolpath generators, as well as slicers, rely heavily on an approach known as "polygon offsetting." In both NC machining and additive manufacturing contexts, the intersection of the input polygon model and a plane defines a set of polygons corresponding to the desired production geometry. In NC machining, it is necessary to offset the toolpath from this geometry in order to provide cutting tool clearances.

Because additive manufacturing machines operate in a layer-by-layer fashion, it is necessary to subdivide the input three-dimensional input model into a series of two-dimensional cross-sections or "slices." To facilitate this process, the input geometry is typically (although not necessarily) given as a series of triangular facets approximating the surface of the object of interest; this reduces the computation of the two-dimensional slices to the calculation of triangle-plane intersections. In additive manufacturing it is necessary to define the perimeters or "shells", as well as a space-filling "infill" pattern, for each slice as seen in FIG. 1. The non-convex geometry of FIG. 2 makes it clear that the use of polygon offsetting to calculate perimeters is a non-trivial task; for instance, once the offset distance reaches a certain magnitude, the offset polygon becomes subdivided. This effect also greatly complicates the calculation of the corresponding infill.

A great number of approaches have been developed to solve the polygon offsetting problem. Many are based on the use of Voronoi diagrams. Alternative approaches are based on the application of various explicit offset transformations.

Efforts to improve the results of slicing, for instance by eliminating voids in the infill portion of the toolpath, have been explored. Recent research into slicing has primarily been focused on increasing computational performance. Additionally, some has focused on "direct" slicers that bypass the aforementioned triangularization step and convert the input CAD geometry directly into toolpaths. Most recently, image-space approaches to slicing have emerged that operate on point-cloud or volumetric image data in a reverse-engineering context. Additionally, slicers intended to produce objects with spatially-varying stiffness properties have also been developed.

SUMMARY OF INVENTION

In view of the above, existing approaches may be broadly characterized as explicit methods descended from the polygon offsetting problem and earlier NC path planning tools. In practice, available slicers operate by means of explicit geometric transforms corresponding to the boundary of each slice $\gamma_i$, as shown in FIG. 3. While this is a sensible choice when the purpose of slicing is viewed from a strictly geometric viewpoint, it is problematic from the standpoint of producing components that imbue a functional purpose. The functional responses of interest, for example mechanical stress, are defined as fields over the volume of the object $\Omega$ and thus over the $\omega$ diagrammed in FIG. 3.

Therefore, described herein is an efficient and flexible implicit methodology for toolpath generation or "slicing" within the domain of additive manufacturing that incorporates functional responses of interest. Also described herein is a set of algorithms used for this purpose that are collectively known as a "slicer." The principal function of this slicer is to convert an input, in the form of a three-dimensional geometric model, into a series of commands that drive the motions and actions of an additive manufacturing machine. Specifically, the present subject matter defines a new implicit mathematical basis for the slicing operation, and provides means for the use of relevant physics fields to dictate the toolpath generated by the slicer. By doing so, aspects of the present invention enable the additive manufacturing of objects and components with physical properties that are tailored towards the object's intended use and function.

According to one aspect of the invention, a method for flexible functionally tailorable slicing for additive manufacturing includes the steps of receiving an input model of an object to be additively manufactured; parsing the input model; reconstructing a domain boundary of the object; computing individual layer boundaries of the object; constructing, for each layer, layer domains from respective enclosing boundaries; computing, for each layer, a perimeter shell; computing, for each layer, a volumetric infill by finding level sets of a field function selected by a user; collecting and arranging into a coherent sequence each perimeter shell and volumetric infill from each layer; and formatting the coherent sequence as motion commands for a target additive manufacturing system.

Optionally, the step of computing individual layer boundaries includes intersecting a series of parallel planes with the domain boundary.

Optionally, the step of computing, for each layer, a perimeter shell includes finding level sets of a distance function applied to the boundaries.

Optionally, the step of computing individual layer boundaries includes partitioning subdomain boundaries into contiguous ordered subsets of line segments.

Optionally, the step of constructing, for each layer, layer domains includes utilizing constrained Delaunay triangulation to define the layer domains as a set of planar facets.

Optionally, the step of computing, for each layer, a volumetric infill by finding level sets of a field function selected by a user includes solving a partial differential equation or system of such equations with user-specified boundary conditions on the domain boundary.

Optionally, the step of computing, for each layer, a volumetric infill by finding level sets of a field function selected by a user includes basing the volumetric infill on relevant physical fields computed by numeric analysis.

Optionally, the field function is equation (3), defined below.

Optionally, the method further includes interfacing with a simulation tool for material mechanics. The field function selected by a user is automatically generated based on computed results of the simulation tool.

Optionally, the method includes interfacing with one or more external data sources or databases. The field function selected by a user is automatically generated based on experimental data from the one or more external data sources or databases.

According to another aspect, a computer program product stored on a non-transitory computer-readable medium is configured to cause one or more processors to execute the following method steps: receiving an input model of an object to be additively manufactured; parsing the input model; reconstructing a domain boundary of the object; computing individual layer boundaries of the object; constructing, for each layer, layer domains from respective enclosing boundaries; computing, for each layer, a perimeter shell; computing, for each layer, a volumetric infill by finding level sets of a field function selected by a user; collecting and arranging into a coherent sequence each perimeter shell and volumetric infill from each layer; and formatting the coherent sequence as motion commands for a target additive manufacturing system.

Optionally, the step of computing individual layer boundaries includes intersecting a series of parallel planes with the domain boundary.

Optionally, the step of computing, for each layer, a perimeter shell includes finding level sets of a distance function applied to the boundaries.

Optionally, the step of computing individual layer boundaries includes partitioning subdomain boundaries into contiguous ordered subsets of line segments.

Optionally, the step of constructing, for each layer, layer domains includes utilizing constrained Delaunay triangulation to define the layer domains as a set of planar facets.

Optionally, the step of computing, for each layer, a volumetric infill by finding level sets of a field function selected by a user includes solving a partial differential equation or system of such equations with user-specified boundary conditions on the domain boundary.

Optionally, the step of computing, for each layer, a volumetric infill by finding level sets of a field function selected by a user includes basing the volumetric infill on stress or strain fields computed by finite element analysis.

Optionally, the field function is equation (3), defined below.

Optionally, the method further includes the step of interfacing with a simulation tool for material mechanics. The field function selected by a user is automatically generated based on computed results of the simulation tool.

Optionally, the method further includes the step of interfacing with one or more external data sources or databases. The field function selected by a user is automatically generated based on experimental data from the one or more external data sources or databases.

The foregoing and other features of the invention are hereinafter described in greater detail with reference to the accompanying drawings.

DETAILED DESCRIPTION

Figure 3:
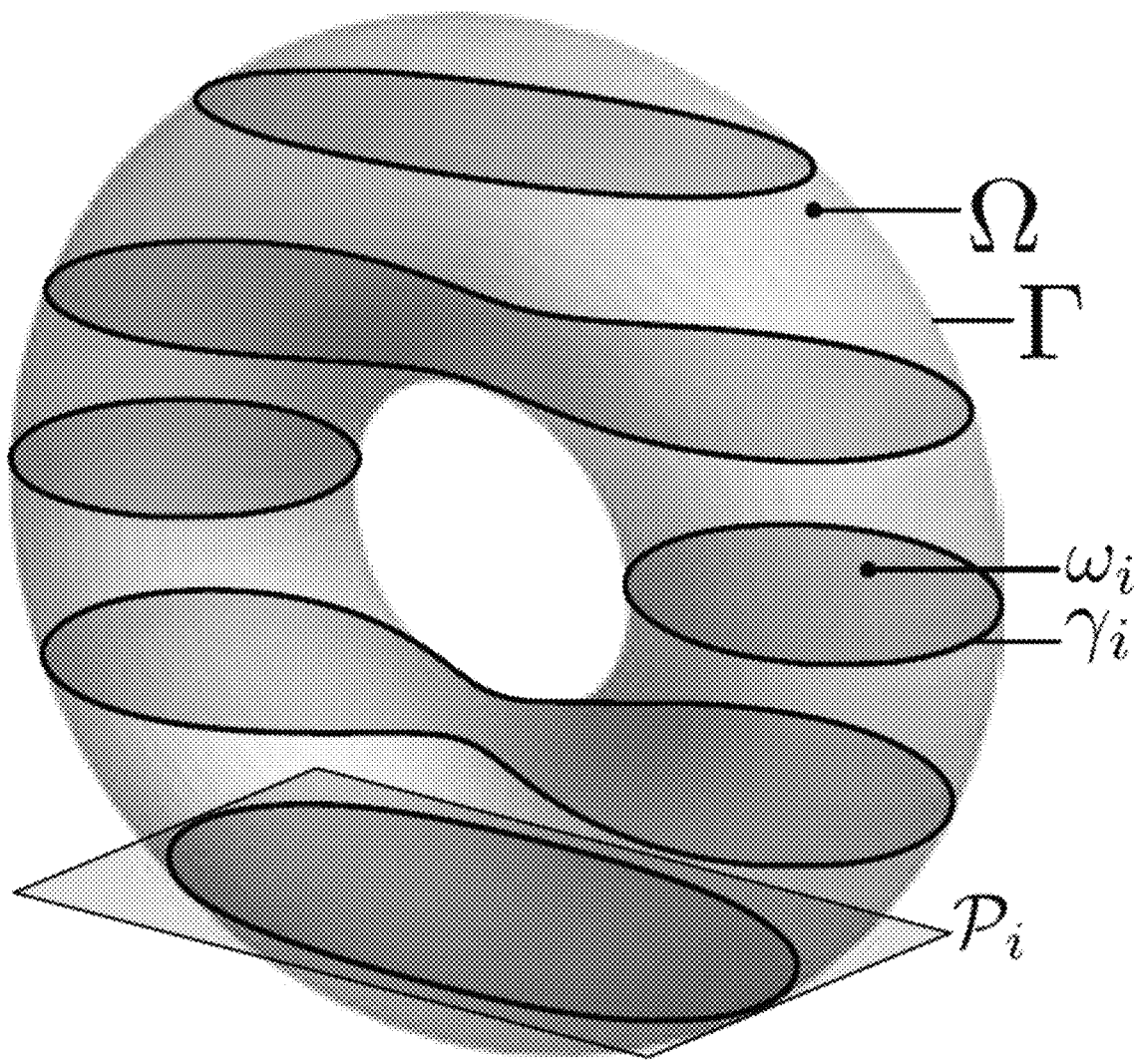
FIG. 3 shows a visualization of exemplary slicer variables.

Presented herein is a slicer in accordance with the present invention, wherein relevant functional fields may be incorporated into the toolpath generation procedure. Unlike prior approaches, exemplary slicers are based on an implicit mathematical formulation; that is to say that the toolpath is based on the level sets of functional fields, not upon transformations applied to the input geometry. Such an exemplary "implicit slicer" 100 includes the following steps, where the variables are illustrated in FIG. 3.

Figure 4:
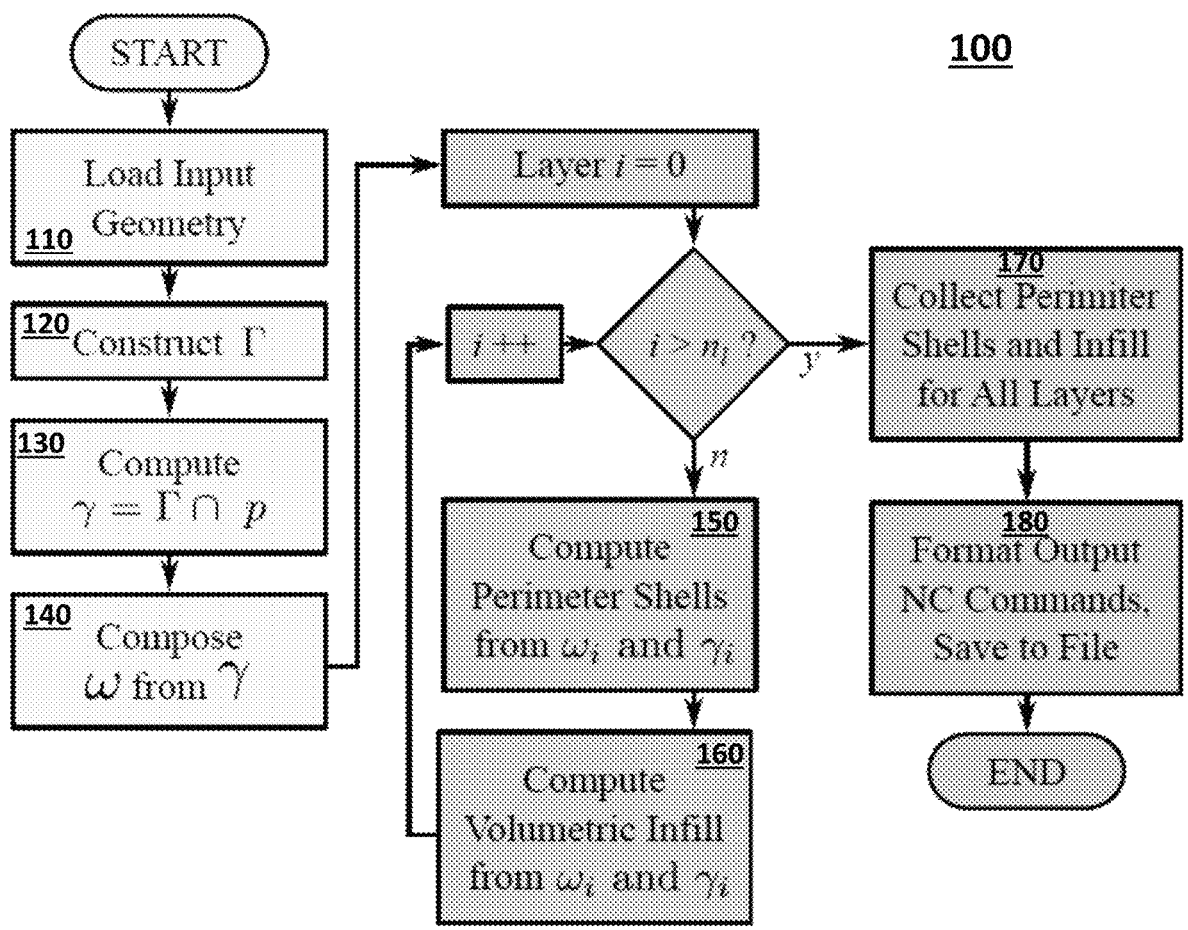
FIG. 4 shows a sequence of operations for an exemplary implicit slicer.

Referring now to FIG. 4, at block 110, the Slicer 100 receives and parses an input model. At block 120, the slicer 100 reconstructs the domain boundary Γ. At block 130, the slicer computes individual layer boundaries (γ) by intersecting a series of parallel planes (ρ) with Γ. At block 140 the slicer 100 constructs, for each layer, the layer domains w from their enclosing boundaries γ. At block 150, for each layer, the slicer 100 computes perimeter shells by finding the level sets of the distance function applied to the boundaries γ. At block 160, the slicer 100, for each layer, computes the volumetric infill by finding the level sets of a field function selected by the user. At block 170, the slicer 100 collects the perimeter shells and volumetric infill from all layers, arranges them into a coherent sequence, and at block 180 formats them as motion commands for the target additive manufacturing system. These blocks are described in more detail below.

In the present application, a standard stereolithography (.stl) file is used as an example for input, due to its widespread use in the additive manufacturing industry. The algorithms presented herein are readily adaptable by those of ordinary skill in the art to other input types once the invention is understood. The only precondition placed on the input file is that it must describe a manifold or finite set of manifolds, without gaps or degenerate geometric features.

The input .stl file explicitly defines Γ as a set of triangular facets ($F$), each defined by three vertices in $\mathbb{R}^3$. Because of the limitations of the .stl file format, which does not contain any long range ordering of the facets nor any connectivity information, Γ is known only in a piecewise, discontinuous fashion.

Figure 5:
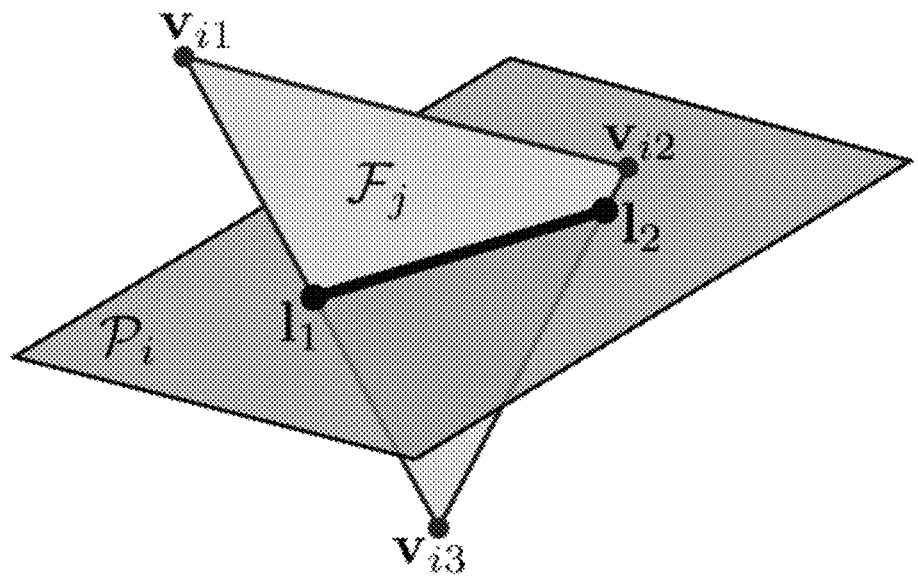
FIG. 5 illustrates the intersection of triangle and slicing plane.
Figure 6:
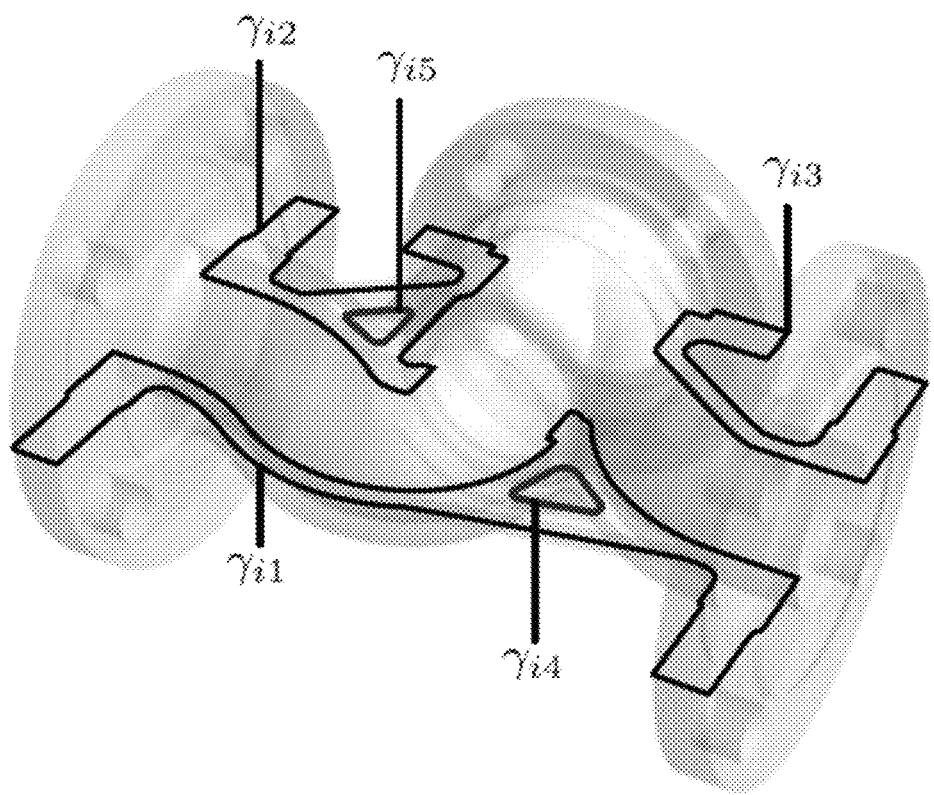
FIG. 6 Illustrates the boundary $\gamma_i$ computed from a slice of model of a valve body.

The subdomain boundaries $\gamma_i$ are computed directly from Γ, by sequential intersections with the slicing planes $\rho_i$ as shown in FIG. 5. Upon the completion of these intersection tests, $\gamma_i$ is a set of line segments without organization. This renders it difficult to directly reconstruct $\omega_i$ from $\gamma_i$; without further organization γ contains no information regarding the topology of ω. This difficulty is illustrated in FIG. 6, and shows that some subsets of $\gamma_i$ define outer boundaries of $\omega_i$, while others define internal "holes."

Referring now to block 130, to enable the recovery of $\omega_i$, $\gamma_i$ is partitioned into contiguous ordered subsets of line segments. Each subset is denoted $\gamma_{ij}$ as shown in FIG. 6. This may be accomplished via any of a number of algorithms, including the algorithm based on depth-first graph search that is well known in the art. At the conclusion of this operation, the $\gamma_{ij}$ are cohesively ordered loops of line segments. From these loops, the corresponding domain may be reconstructed.

Figure 7:
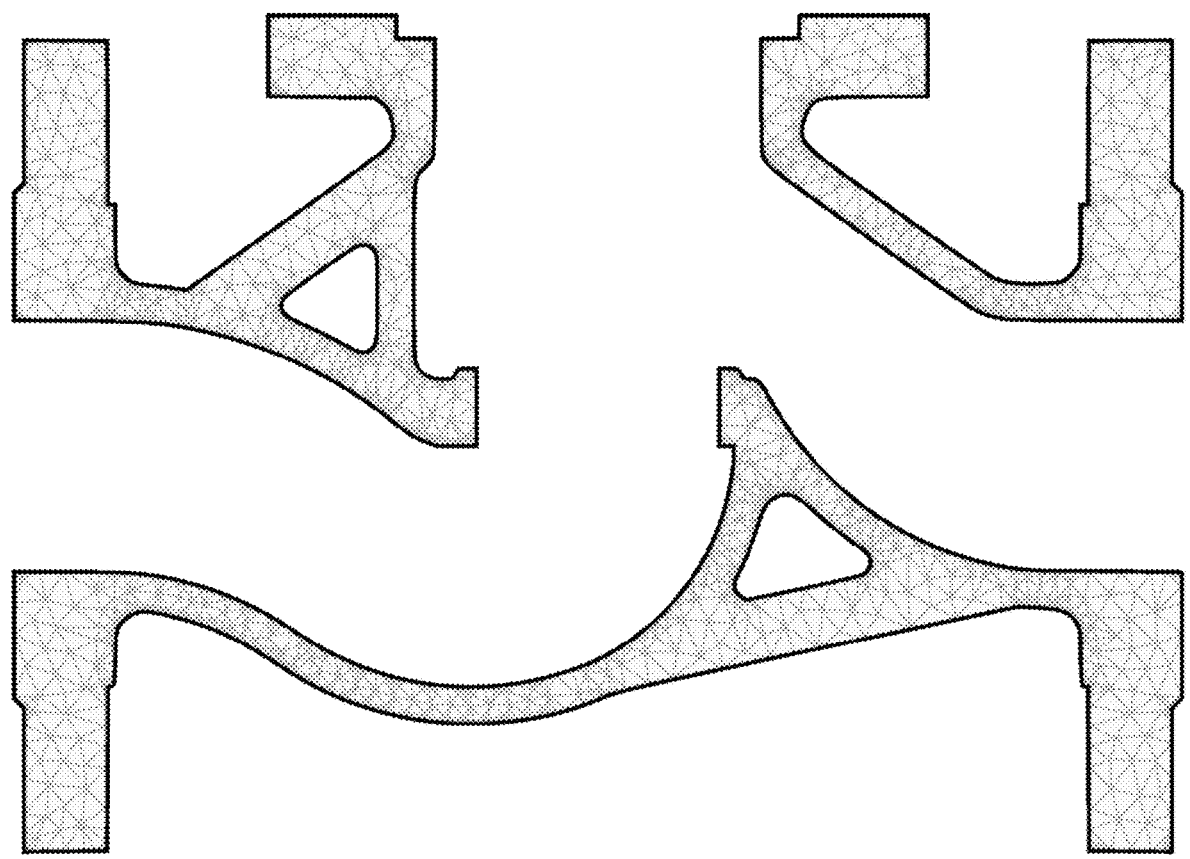
FIG. 7 shows the domain $\omega_i$ corresponding to the $\gamma_{ij}$ of FIG. 6 calculated sing constrained Delaunay triangulation.

Referring now to block 140, once $\gamma_i$ has been properly organized, the reconstruction of the domain $\omega_i$ may be achieved using several well-known algorithms. In the present application, by way of example, we utilize constrained Delaunay triangulation for this purpose. This approach is available, for example, in commonly-used computer algebra tools such as Mathematica and Matlab. The result of computing the $\omega_i$ corresponding to the $\gamma_{ij}$ of FIG. 6 is shown in FIG. 7. The procedures detailed in reference to blocks 130 and 140 is repeated for every slicing plane in order to compute all elements of ω. Once this process has been completed, these domains are defined as a set of planar facets $f$. These domains are used to bound the implicit field functions and compute the slicer toolpath, as described below.

Once the boundaries and domains for each layer have been defined, the additive manufacturing machine toolpath is determined by the calculation of the level sets of functions defined upon these domains and boundaries. For simplicity, but without loss of generality, we examine the specific case where the perimeters and infill are each dictated by a single field function, $H_{pr}$ and $H_{in}$, respectively. In general, several different fields could be weighted and combined to weigh different functional objectives in order to produce $H_{pr}$ and $H_{in}$.

The most fundamental requirement of the slicer is that the output toolpath must replicate the geometry of the input model. Since the shape of γ must be strongly encoded in $H_{pr}$, the distance transform is the most logical selection for this function. With this choice, $$H_{pr}(x) = \min \|x - x_\gamma\|, x_\gamma \in \gamma_i \quad (1)$$

Figure 1:
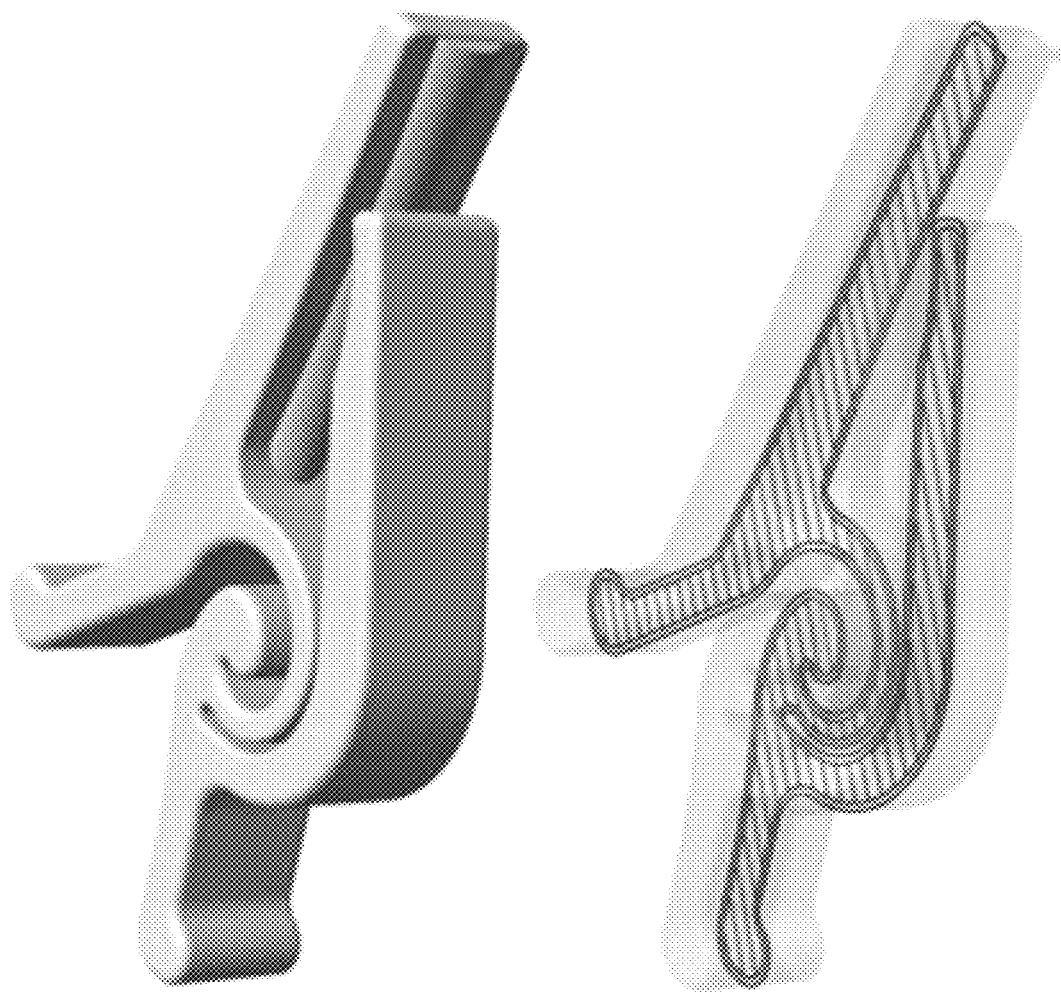
FIG. 1 illustrates toolpath concepts. Note the perimeter "shells" (double line) that enclose a sparse "infill" pattern (single, diagonal lines); this combination of path types is commonly used in additive manufacturing applications.
Figure 2:
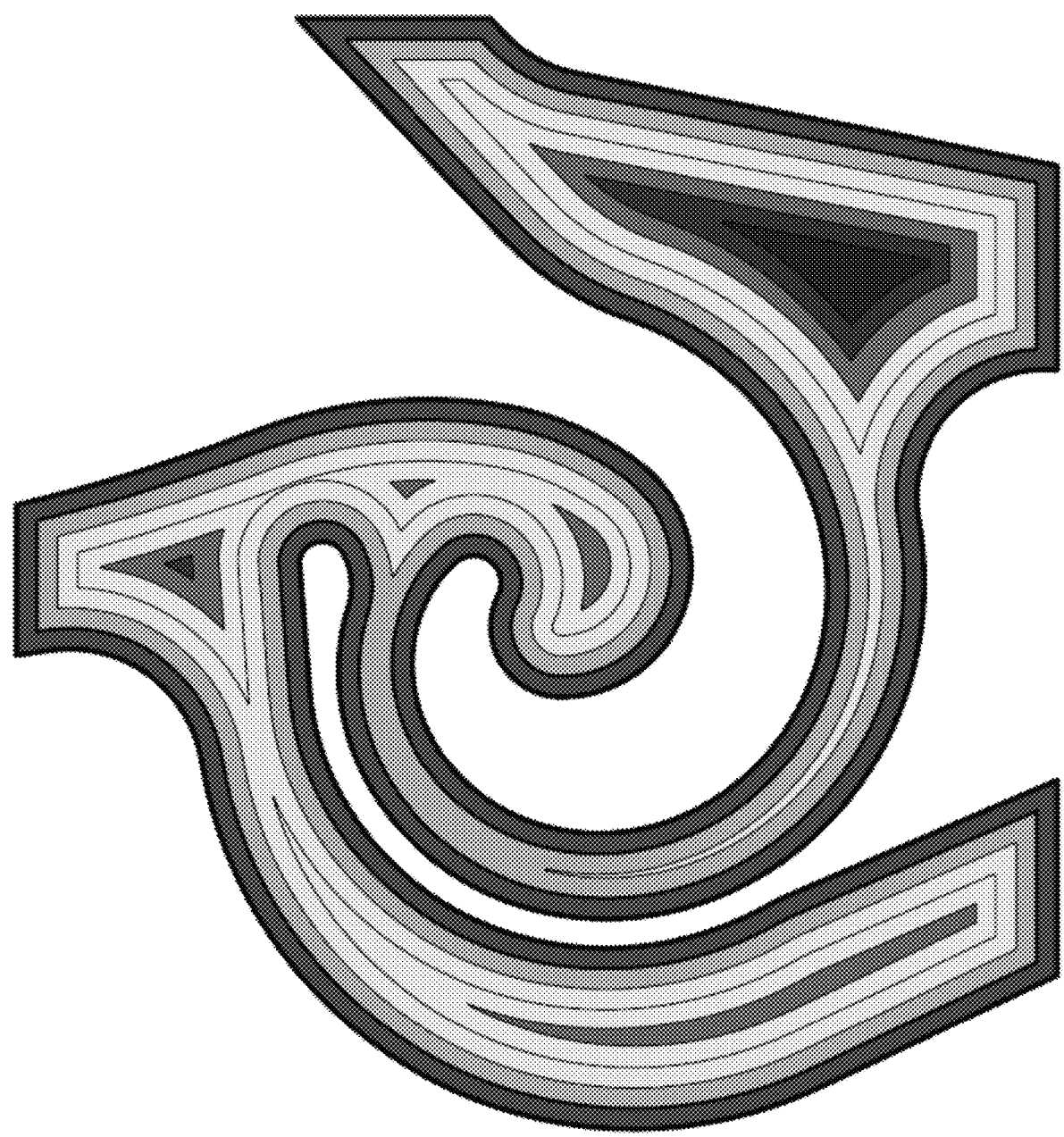
FIG. 2 Illustrates polygon offsetting. The original outermost polygon is successively offset by a constant distance, producing a vanishing series of smaller polygons.
Figure 8:
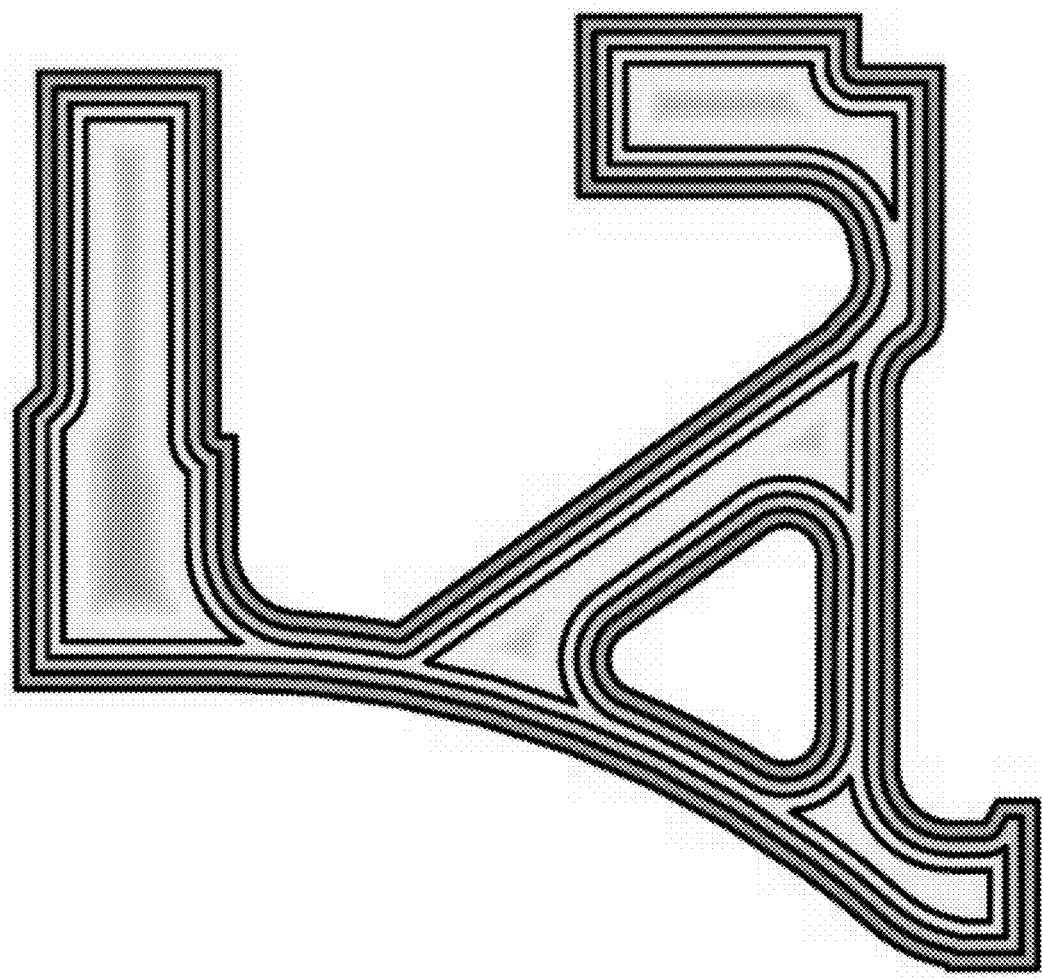
FIG. 8 shows the results of the application of the distance transform to a portion of the domain seen in FIG. 7

FIG. 8 illustrates the perimeters generated by this approach when applied to a portion of the domain seen in FIG. 7. In this case (and without loss of generality) four equally-spaced perimeters are computed. However, the present methodology may be used to produce perimeters at arbitrary or user-specified spacings as well. It is seen that the implicit formulation capably handles cases of vanishing and subdividing inner perimeters; it effectively solves the polygon offsetting problem illustrated in FIG. 2 without the need for handling many special cases.

Figure 9A:
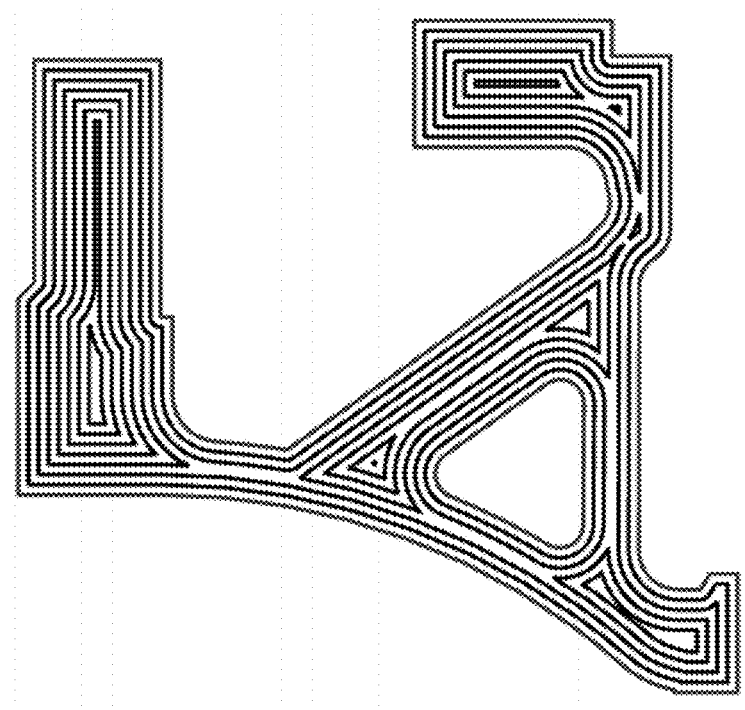
FIG. 9A shows a concentric $H_{in}(x)=H_{pr}(x)$ selection for the infill function. $x_x$ and $x_y$ denote the Cartesian components of x, while a and b denote free parameters that may be changed to vary the infill pattern (e.g. scaling, density, or rotation).
Figure 9B:
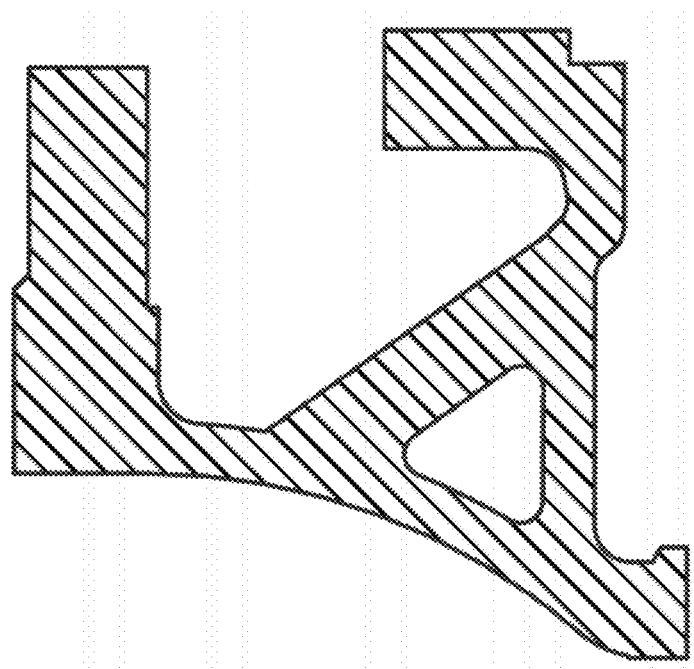
FIG. 9B shows a linear $H_{in}(x)=ax_x+bx_y$ selection for the infill function. $x_x$ and $x_y$ denote the Cartesian components of x, while a and b denote free parameters that may be changed to vary the infill pattern (e.g. scaling, density, or rotation).
Figure 9C:
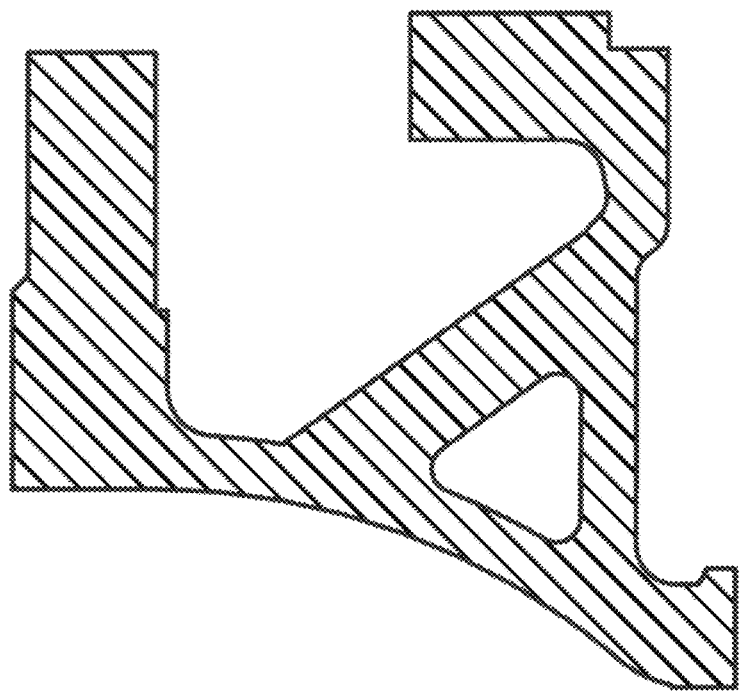
FIG. 9C shows a wave $H_{in}(x)=a\sin(bx_x)+x_y$ selection for the infill function. $x_x$ and $x_y$ denote the Cartesian components of x, while a and b denote free parameters that may be changed to vary the infill pattern (e.g. scaling, density, or rotation).
Figure 9D:
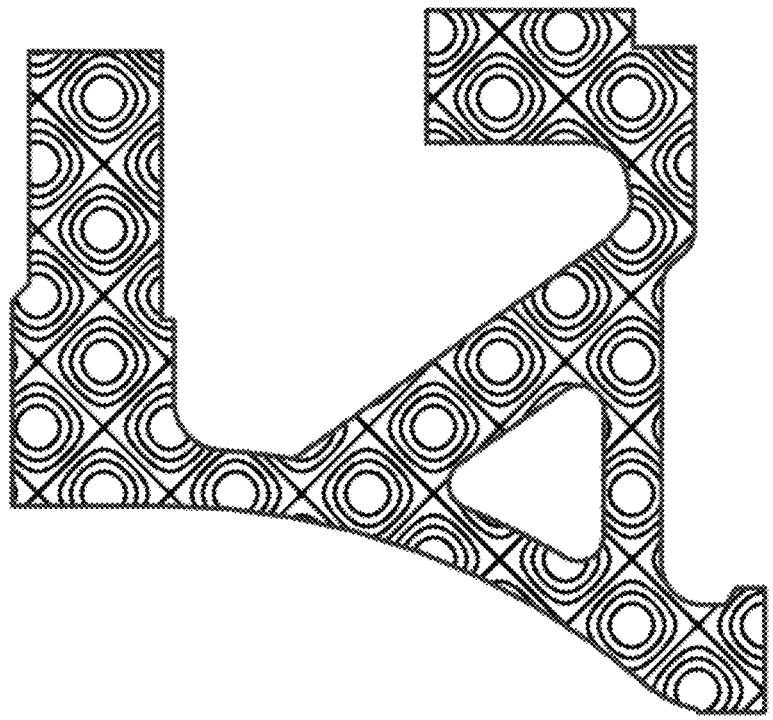
FIG. 9D shows an eggcrate $H_{in}(x)=\sin(ax_x)^2+\sin(bx_y)^2$ selection for the infill function. $x_x$ and $x_y$ denote the Cartesian components of x, while a and b denote free parameters that may be changed to vary the infill pattern (e.g. scaling, density, or rotation).
Figure 9E:
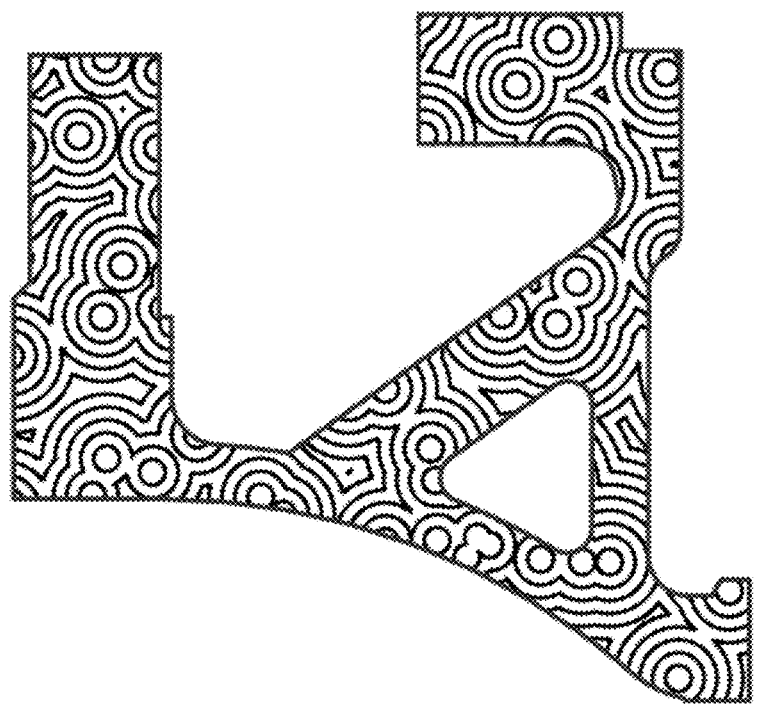
FIG. 9E shows a randomized $H_{in}(x)=\min\|x-xrand\|$ selection for the infill function. $x_x$ and $x_y$ denote the Cartesian components of x, while a and b denote free parameters that may be changed to vary the infill pattern (e.g. scaling, density, or rotation).
Figure 9F:
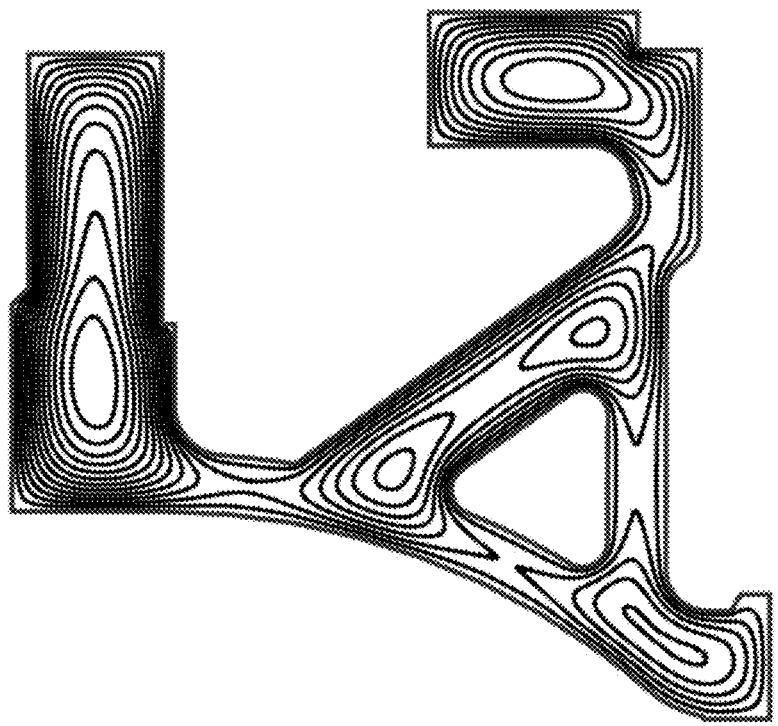
FIG. 9F shows a Poisson $\nabla^2 H_{in}=a$, $H_{in}(x)=0$, $x \in \gamma$ selection for the infill function. $x_x$ and $x_y$ denote the Cartesian components of x, while a and b denote free parameters that may be changed to vary the infill pattern (e.g. scaling, density, or rotation).

While the form of $H_{pr}$ is necessarily dictated by γ, the infill function $H_{in}$ is not similarly constrained. This is one of the principle advantages of the implicit methodology, as the infill may be dictated by an arbitrary field of functional or design interest. Several examples are given in FIGS. 9A-F. FIGS. 9A and 9B show simple closed-form functions that replicate infill strategies commonly employed by existing commercial slicers. FIGS. 9C and 9D show alternate closed-form selections that demonstrate the flexibility of the implicit approach. FIG. 9E shows an infill pattern based on a stochastic pseudo-random number generator, and FIG. 9F shows an infill pattern based on the solution to Poisson's equation with a Dirichlet boundary condition on γ. It is important to note that the field function $H_{in}$ need not have a closed analytic form; it may be defined numerically or by other means.

The infill patterns of FIG. 9 are representative of one layer $\omega_i$ of the entire toolpath. It is typical to modulate the infill pattern between layers, for instance to rotate the linear infill by 90° between layers. In FIG. 9 it is assumed that the $\omega_i$ are parallel to the xy-plane. In this frame of reference, the modulation would take the form of a functional dependence of $H_{in}$ on z.

The only restriction on $H_{in}$ is that it must be a function that returns a real-valued result. This opens the possibility of using the infill to couple the performance properties of the additively manufactured component to some field of engineering or design interest. For example, the stress or strain fields computed by finite element analysis (FEA) could be used as the basis for the infill geometry.

Due to the widespread use of contour plots in a huge number of computer tools and programs, algorithms for computing level sets and contours of functions/data are very well developed and may be used in exemplary slicers. Various fast algorithms for the calculation of contours have been developed, and these algorithms are embodied in virtually all modern computer algebra tools, as well as in libraries for most computer programming languages.

Figure 10:
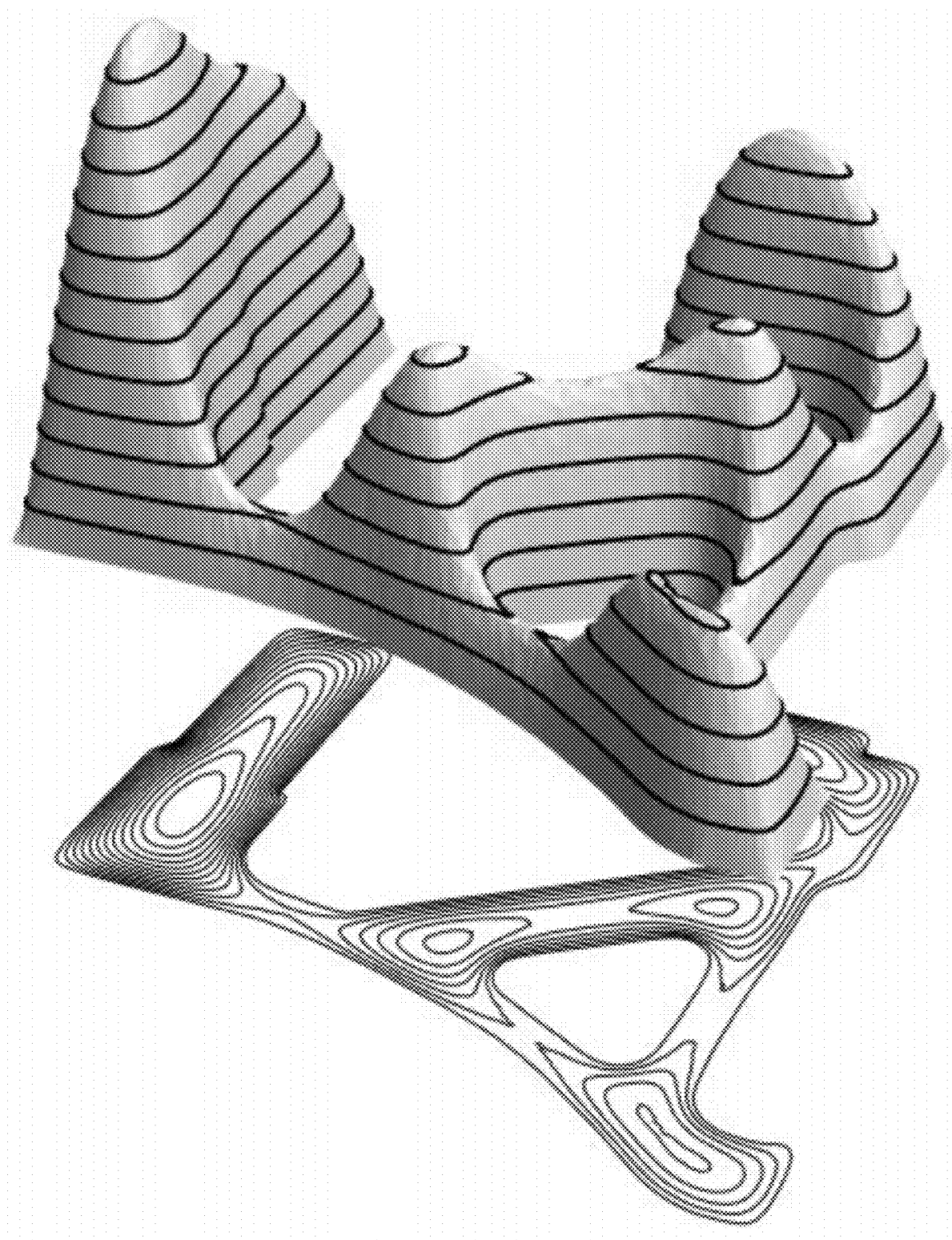
FIG. 10 illustrates the contour computing process. The domain $\omega_i$ transformed into $\mathbb{R}^3$ is shown at top, intersections with the slicing planes defined by $c_k$ are highlighted. These contours, projected back into $\mathbb{R}^2$, are shown in the lower portion of the figure.

Any of the existing algorithms for computing contour plots may be employed to calculate the contours of $H_{in}$ in order to produce the corresponding toolpath components. In the present work, the following method is employed. The function $H_{in}$ is used to transform the 2D mesh of $\omega_i$ into the 3D domain by application of this function to the mesh vertex coordinates. This 3D mesh is then intersected by parallel planes using the algorithm described earlier for the calculation of $\gamma_i$ from $\Gamma$. The sets of line segments resulting from this intersection are then projected back into 2D space. This process is illustrated in FIG. 10.

Figure 11:
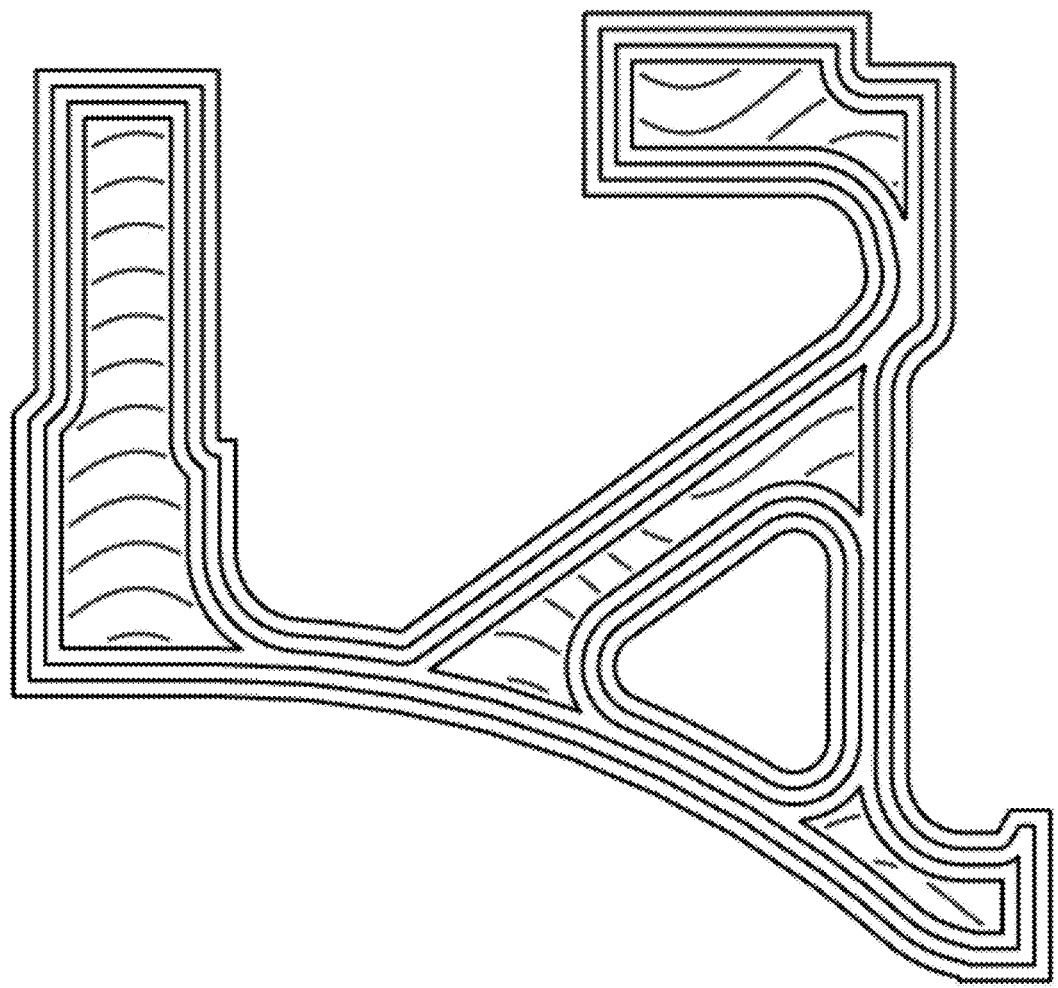
FIG. 11 shows a combination of the perimeter toolpaths from FIG. 8 and the wave infill of FIG. 9(c). A small positive value for ε produces a gap between infill and perimeters.

Once the perimeter and infill tool path components have been computed individually for each layer, they must be assembled into a single cohesive NC program. The first stage of this process is to ensure that the infill and perimeter toolpaths for each layer are compatible and do not overlap. This is achieved by pruning the infill contours and discarding any portions of the infill that fall outside of the innermost perimeter shell. A small margin of overlap (or clearance) between the infill and perimeters may be provided if necessary. An example showing the infill trimmed to fit the perimeters is given in FIG. 11, where a small clearance is provided.

The sequencing of the toolpaths within each layer is a general combinatorial optimization problem that is constrained by the physics of the additive manufacturing process that is being targeted by the slicer. Any of a large number of existing optimization algorithms and tools may be utilized to effect a solution to this problem. As an example, herein is illustrated a relatively simple scheme: For every layer:

1. Begin with the outermost perimeter, traverse it in a clockwise fashion, starting/ending at a randomly selected point.
2. Select the nearest point on the next perimeter, traverse in clockwise fashion. Repeat for all perimeters.
3. Select the endpoint of an infill curve that is nearest to the start/end point of the final perimeter. Traverse it to the other endpoint.
4. Select the endpoint of an untraversed infill curve that is closest to the current endpoint. Traverse this new infill curve. Repeat until all infill curves are traversed.

Once these steps have been completed for every layer, the final output toolpath is simply the sequence of these layers from first to last (typically from lowest to highest in the z-direction). These motion commands are converted to machine specific NC-commands, often known as "g-codes" in a trivial fashion. These commands can then be transmitted to an additive manufacturing machine for execution. We note that such transmission and physical manufacturing processes are well understood in the art and will not be further explained for the sake of brevity.

Many components which are additively manufactured require so-called "support material." This support material is deposited by the additive manufacturing process outside of the component domain, in order to prevent the sagging or curling of the component itself under gravitational or other forces during the manufacturing process. The implicit methodology may also be used to compute the toolpaths associated with the support material, in a very simple fashion. The support material domain $\omega_{si}$, for any layer is defined as the difference between a layer's region $\omega_i$ and the union of all layer regions above $\omega_i$. The distance transform may be used to compute perimeters for this support region, and any suitable function may be used to compute the support region infill, in a fashion identical to that described previously.

Figure 12:
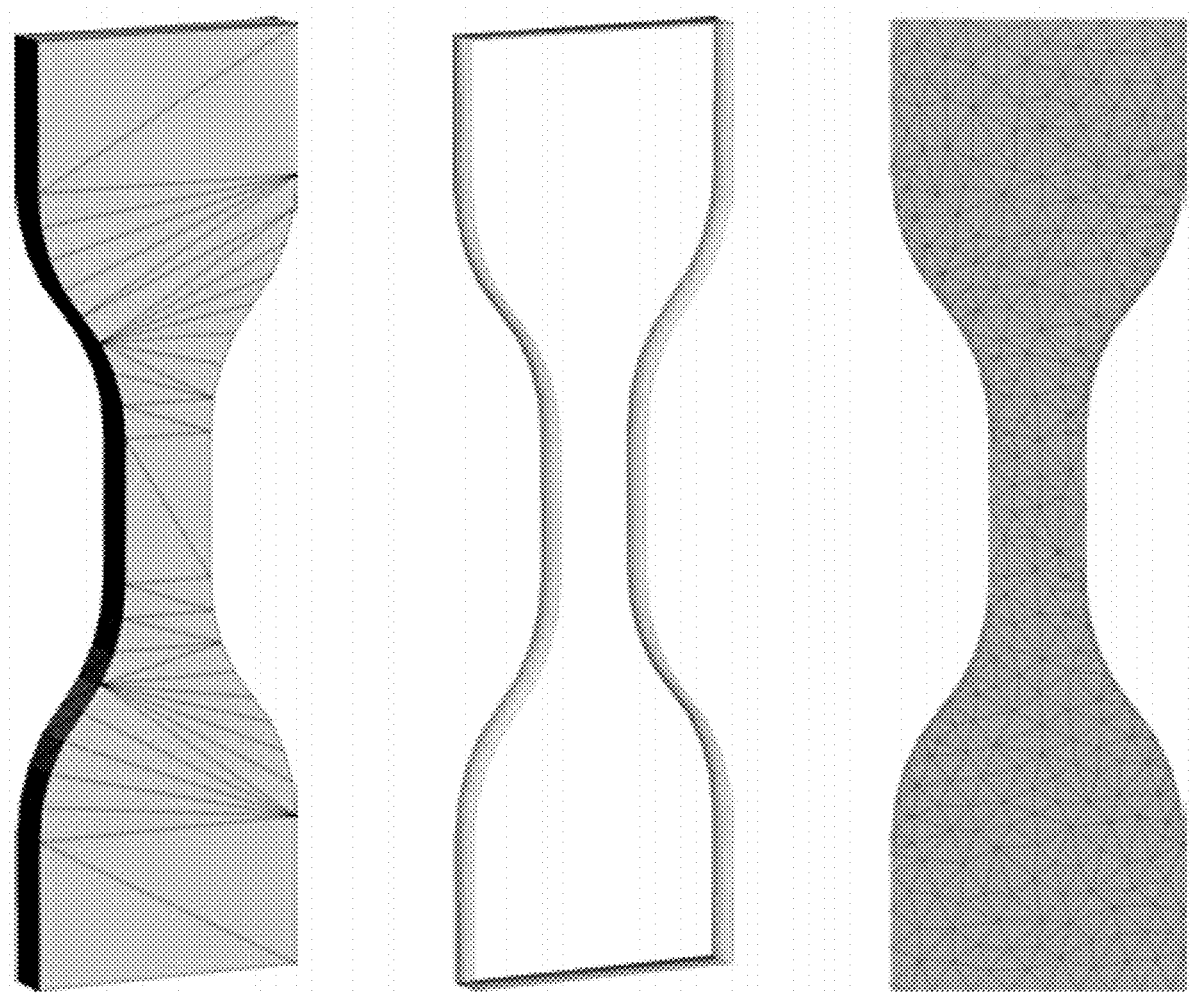
FIG. 12 shows an input dogbone geometry in .stl format. Note the triangular facets that constitute Γ. The layer boundaries γ are computed for each layer. The domain $\omega_i$ are computed for the first layer. Because the dogbone shape is uniform through the thickness, all other layers have similar ω, with small differences caused by the faceted nature of the input model.
Figure 13:
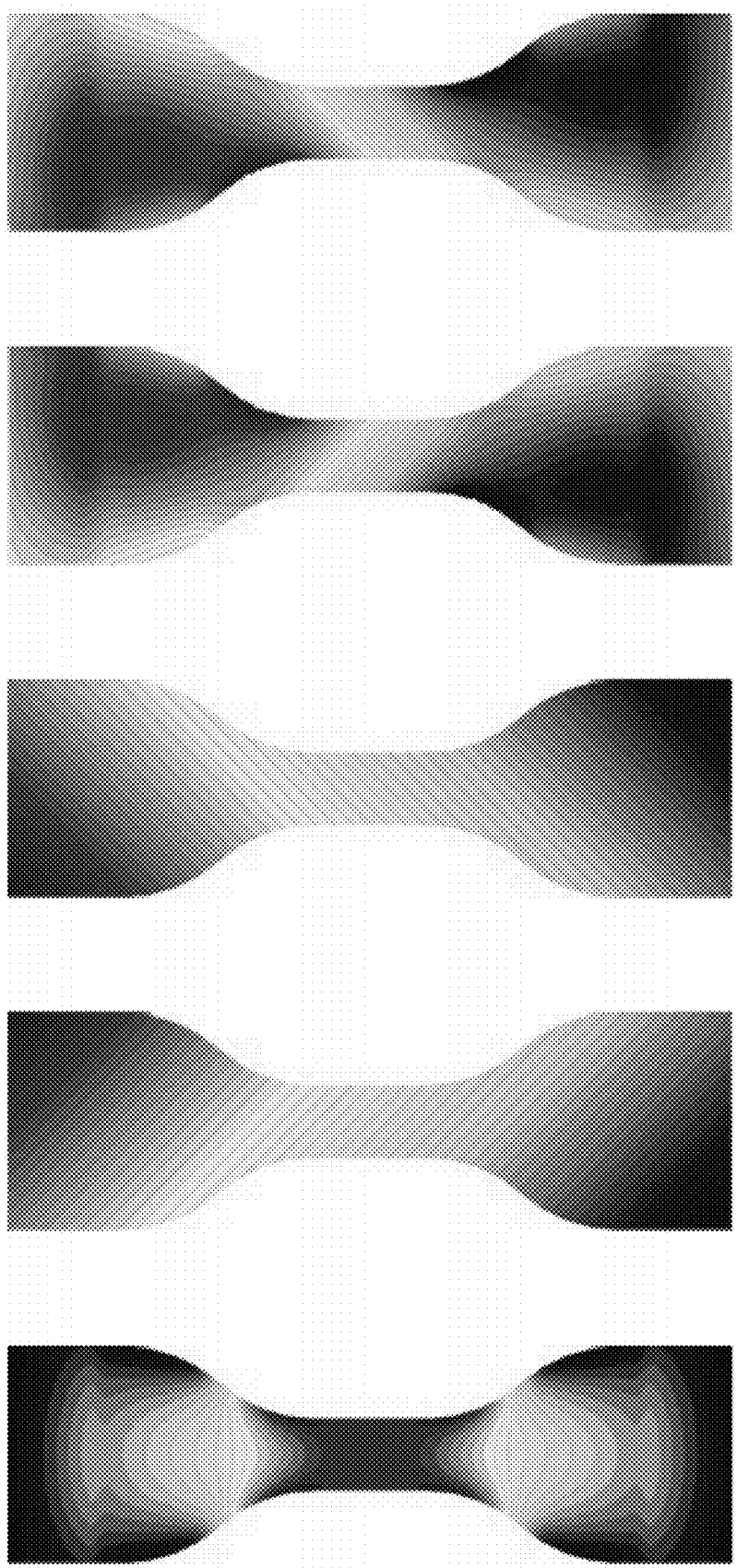
FIG. 13 Shows a visualization of infill field functions. From left to right: numerically calculated stress field $\sigma_{vm}$; linear infill field $H_{lin}$ for the first (and all odd-numbered) layers; linear infill field $H_{lin}$ for the second (and all even-numbered) layers; stress-modulated infill field $H_{in}$ for the first (and all odd-numbered) layers; stress-modulated infill field $H_{in}$ for the second (and all even-numbered) layers.

Now presented is a simple example: a "dogbone" test specimen designed to support uniaxial tension loads. The input geometry of the dogbone test specimen is shown in FIG. 12, along with the associated $\gamma$ and $\omega$. The Comsol Multiphysics Finite Element Analysis (FEA) software tool was used to simulate the application of a 1 kN tension load to the specimen. FIG. 13 shows the Von-Mises stress distribution ($\sigma_{vm}$) that results. From this stress distribution, a modulated linear infill function was computed. A purely rectilinear grid infill, as used in may existing slicers, may be calculated $$H_{lin}(x, y, z) = x + y \cdot (-1^{(z/l_t)\%2})\qquad(2)$$

where x and y are the Cartesian coordinates within each slice, z is the Cartesian coordinate normal to the slices, $l_t$ is the layer thickness, and % indicates the arithmetic modulo operator. This function creates a grid of parallel diagonal lines for each slice's infill, with the lines changing orientation by 90 degrees every layer. In this example, the linear infill is modulated according to the value of $\sigma_{vm}$ in order to produce infill that is denser in high-stress regions. The infill function thus takes the form $$H_{in}(x, y, z) = \sigma_{vm}(x, y, z) H_{lin}(x, y, z)\, k,\qquad(3)$$

where k is a scalar parameter that controls the relative infill density. A visualization of the field functions $\sigma_{vm}$, $H_{lin}$, and $H_{in}$ is given in FIG. 13.

Figure 14:
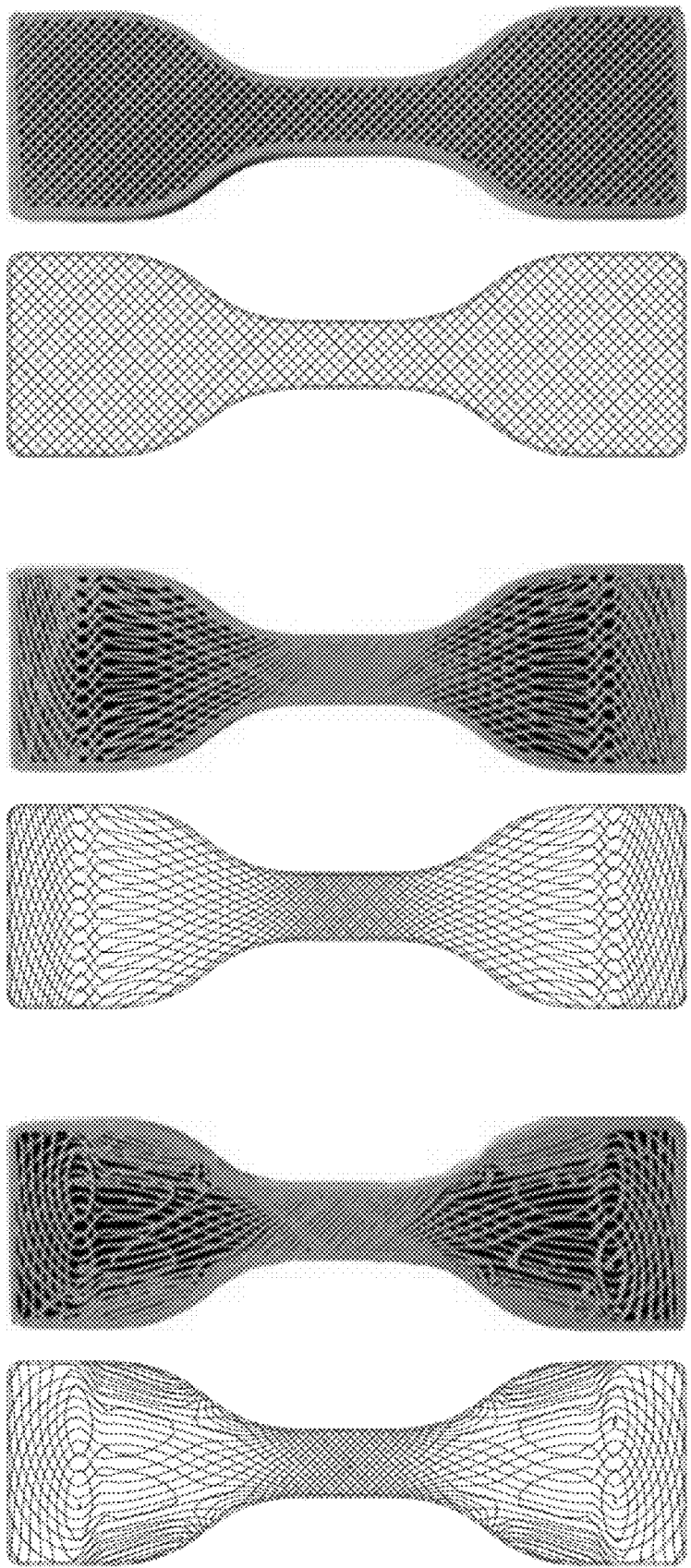
FIG. 14 shows three pairs of toolpath and corresponding physical specimens with, from left to right, $H_{in}(x,y,z)=\sigma_{vm}(x,y,z)*H_{lin}*(x,y,z)*k$, termed "Stress Infill A;" $H_{in}(x,y,z)=\sigma_{vm}(x,0,0)*H_{lin}*(x,y,z)*k$, termed "Stress Infill B;" and $H_{in}(x,y,z)=H_{lin}(x,y,z)*k$, termed "Linear Infill."

FIG. 14 shows the final toolpath design produced by the implicit slicer. Also shown is a physical realization of this toolpath, produced on a consumer fused-deposition modeling (FDM) 3D-printer. In order to provide a comparison, the implicit slicer was also used to produce dogbone test specimens using a different modulation pattern, with $H_{in}(x, y, z) = \sigma_{vm}(x, 0, 0) H_{lin}(x, y, z)\, k$. Finally, reference specimens were produced using the unmodulated, uniform infill function $H_{in} = H_{lin}$. The density parameter k was tuned so that all three types of specimens were of identical mass.

Three replicates of each specimen photographed in FIG. 14 were created. Each was printed sequentially, using an identical set of instructions sent to the additive manufacturing machine so as to minimize differences between replicates. The specimens were gripped and loaded in tension until failure using a small uniaxial test frame. Full-field techniques were used to measure the specimen strains during testing.

Figure 15:
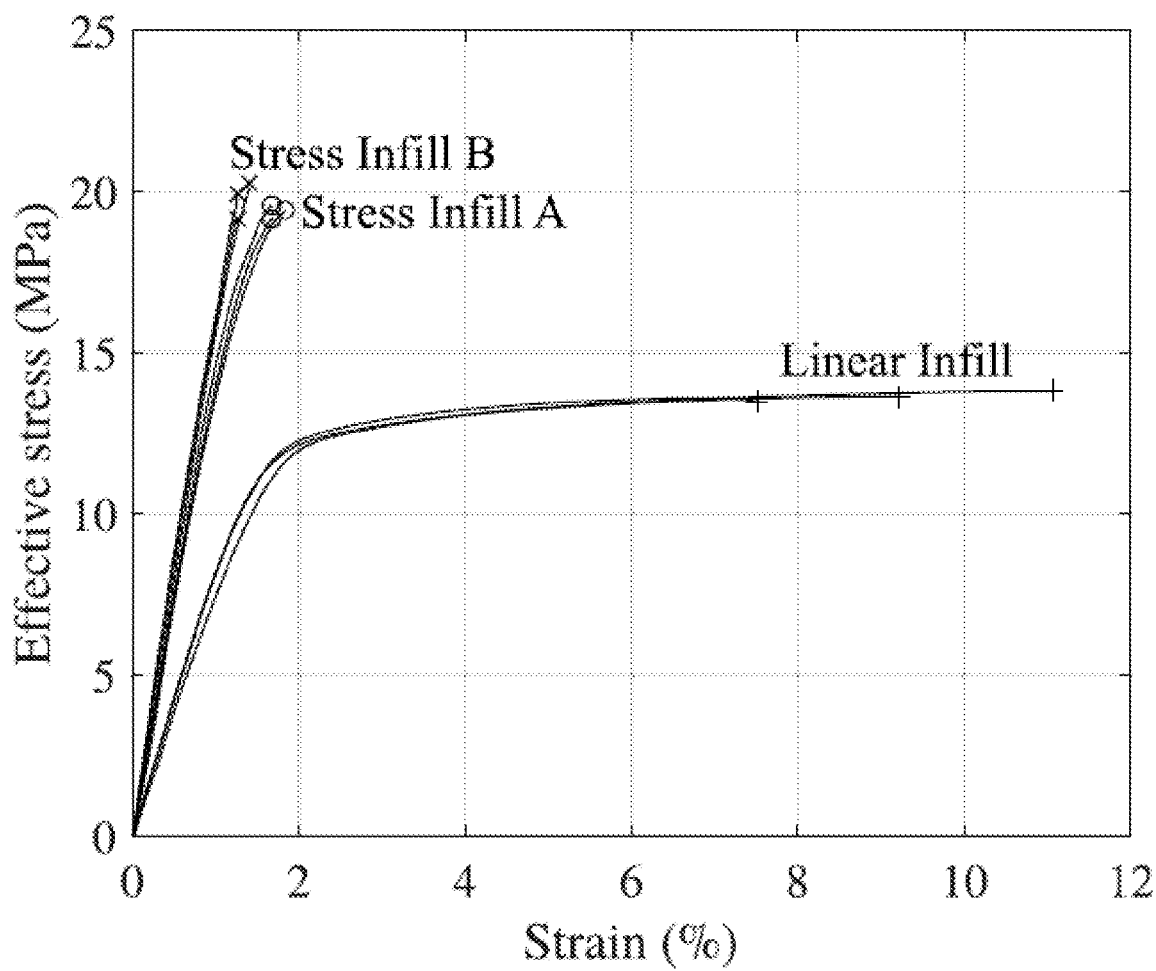
FIG. 15 shows results from the testing of the additively manufactured specimens shown in FIG. 14.

The results of the testing are shown in FIG. 15. It is seen that the properties of the specimens featuring stress-modulated infill are markedly different than those of the specimens with conventional linear infill. The ultimate failure stress is increased by 45%, and the apparent elastic modulus is increased by more than 100%. These results clearly demonstrate that the implicit slicer may be used to alter the properties of an additively manufactured object in order to produce enhanced performance with respect to its intended function.

The present invention provides for many advantages and new features when compared to conventional explicit slicing tools. Exemplary implicit slicing tools enable the tailoring of the physical responses of additively manufactured components, structures, and objects. It may be used to produce objects with specified properties or performance. Further, exemplary slicers may be used to create objects that are "functionally graded" and feature variations in properties or performance throughout the spatial domain. For example, objects may be designed to fail in a pre-specified, controlled fashion (i.e. a mechanical 'fuse'). In contrast to explicit slicers, exemplary implicit slicers allow for the generation of toolpaths that are based on the physical response of the object being produced and its intended use or function—even based on multiple physical responses of interest simultaneously.

Exemplary slicers may interface with existing simulation tools for material mechanics. These include finite element solvers and other simulations of physical phenomena. Results computed by these tools may be used to direct the toolpath generation process in order to achieve a specified response, property, or performance. Moreover, exemplary slicers may interface with external data sources and databases that may be produced by any source. For example, results from full-field strain imaging during a physical experiment may be used to dictate the toolpath generation process.

Exemplary slicers may utilize an extremely general implicit formulation and can slice arbitrarily complex models, solving the polygon offsetting problem in a computationally straightforward fashion. Exemplary slicers may reconstruct each slice as a 2D geometric domain. These domains may be used to effect a solution to a relevant physics problem in order to generate the infill. Further, exemplary slicers may utilizes the distance transformation to compute the perimeter shells, and thereby solve the polygon offsetting problem in a simple, computationally straightforward manner.

Exemplary slicers may allow for non-uniform or user specified spacing perimeter shells and/or geometric infill patterns. The variety of infill patterns that may be generated using the implicit method are much more numerous than those that may be realized using conventional slicers. Exemplary slicers may also allow for variation in slice thickness in order to improve geometric tolerances.

Moreover, exemplary slicers allow for the generation of functionally tuned ancillary structures such as support material. These structures may optionally be designed to reduce sagging, warping, distortion, or other deleterious phenomena, which may occur during the additive manufacturing process.

Exemplary slicers may be used to create toolpaths for any additive manufacturing technology, system, or machine, and should not be considered limited to examples used herein. Additionally, exemplary slicers are applicable to additive manufacturing systems for plastics, polymers, metals, ceramics, and other materials. They are applicable to manufacturing systems that use lasers, electron beams, heated dies, or other tools to deliver material and/or energy. Exemplary slicers can use any suitable input file format and produce output files of any format necessary, provided that the details of that format are available.

Various blocks, processing functions, logic or modules described above may be provided by one or more discrete processing units, modules or components. Additionally, various blocks, processing functions, logic or modules described above may be provided by a system controller or system control logic.

Unless specifically stated otherwise, as apparent from the forgoing discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more blocks, units, modules or embodiments may be combined with, or may be utilized in various combination with one or more other functions, operations, components and/or features described herein with reference to one or more other units, modules or embodiments.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method for flexible functionally tailorable slicing for additive manufacturing, the method including the steps of:
   receiving an input model of an object to be additively manufactured;
   parsing the input model;
   reconstructing a domain boundary of the object;
   computing individual layer boundaries of the object;
   constructing, for each layer, layer domains from respective enclosing boundaries;
   computing, for each layer, a perimeter shell by finding level sets of distance function applied to the boundaries;
   computing, for each layer, a volumetric infill by finding level sets of a specified field function;
   collecting and arranging into one or more contiguous ordered sets of line segments each perimeter shell and volumetric infill from each layer; and
   formatting the one or more contiguous ordered sets of line segments as motion commands for a target additive manufacturing system.

2. The method of claim 1, wherein the step of computing individual layer boundaries includes intersecting a series of parallel planes with the domain boundary.

3. The method of claim 1, wherein the step of computing individual layer boundaries includes partitioning subdomain boundaries into contiguous ordered subsets of line segments.

4. The method of claim 1, wherein the step of constructing, for each layer, layer domains includes utilizing constrained Delaunay triangulation to define the layer domains as a set of planar facets.

5. The method of claim 1, wherein the step of computing, for each layer, a volumetric infill by finding level sets of a field function selected by a user includes solving a partial differential equation or system of such equations with user-specified boundary conditions on the domain boundary.

6. The method of claim 1, wherein the step of computing, for each layer, a volumetric infill by finding level sets of a field function selected by a user includes basing the volumetric infill on relevant physical fields computed by computational simulation.

7. The method of claim 1, wherein the field function is a user-specified modulation of another field function based on relevant physical fields as computed by the solution of one or more partial differential equations or of computational simulation.

8. The method of claim 1, further comprising the step of:
   interfacing with a simulation tool for material mechanics; and
   wherein the specified field function is automatically generated based on computed results of the simulation tool.

9. The method of claim 1, further comprising the step of:
   interfacing with one or more external data sources or databases; and
   wherein the field function selected by a user is automatically generated based on experimental data from the one or more external data sources or databases.

10. The computer program product of claim 1, wherein the specified field function is selected by a user.

11. A computer program product stored on a non-transitory computer-readable medium, the computer program product configured to cause one or more processors to execute the method comprising the steps of:
   receiving an input model of an object to be additively manufactured;
   parsing the input model;
   reconstructing a domain boundary of the object;
   computing individual layer boundaries of the object;
   constructing, for each layer, layer domains from respective enclosing boundaries;
   computing, for each layer, a perimeter shell by finding level sets of distance function applied to the boundaries;
   computing, for each layer, a volumetric infill by finding level sets of a specified field function;
   collecting and arranging into one or more contiguous ordered sets of line segments each perimeter shell and volumetric infill from each layer; and
   formatting the one or more contiguous ordered sets of line segments as motion commands for a target additive manufacturing system.

12. The computer program product of claim 11, wherein the step of computing individual layer boundaries includes intersecting a series of parallel planes with the domain boundary.

13. The computer program product of claim 11, wherein the step of computing individual layer boundaries includes partitioning subdomain boundaries into contiguous ordered subsets of line segments.

14. The computer program product of claim 11, wherein the step of constructing, for each layer, layer domains includes utilizing constrained Delaunay triangulation to define the layer domains as a set of planar facets.

15. The computer program product of claim 11, wherein the step of computing, for each layer, a volumetric infill by finding level sets of a field function selected by a user includes solving a partial differential equation or system of such equations with user-specified boundary conditions on the domain boundary.

16. The computer program product of claim 11, wherein the step of computing, for each layer, a volumetric infill by finding level sets of a field function selected by a user includes basing the volumetric infill on stress or strain fields computed by computational simulation.

17. The computer program product of claim 11, wherein the field function is a user-specified modulation of another field function based on relevant physical fields as computed by the solution of one or more partial differential equations or of computational simulation.

18. The computer program product of claim 11, further comprising the step of:
   interfacing with a simulation tool for material mechanics; and
   wherein the specified field function is automatically generated based on computed results of the simulation tool.

19. The computer program product of claim 11, further comprising the step of:
   interfacing with one or more external data sources or databases; and wherein the field function selected by a user is automatically generated based on experimental data from the one or more external data sources or databases.

20. The computer program product of claim 11, wherein the specified field function is selected by a user.

* * * * *